United States Patent [19]

Hunger et al.

[11] 4,195,020
[45] Mar. 25, 1980

[54] DICHLORO-PHENYL-AZO-ACETOACETYLAMINO-BENZIMIDAZOLONE PIGMENTS

[75] Inventors: Klaus Hunger, Kelkheim; Joachim Ribka, Offenbach am Main, both of Fed. Rep. of Germany

[73] Assignee: Hoechst Aktiengesellschaft, Frankfurt, Fed. Rep. of Germany

[21] Appl. No.: 15,603

[22] Filed: Feb. 23, 1979

Related U.S. Application Data

[63] Continuation of Ser. No. 703,243, Jul. 7, 1976, abandoned, which is a continuation of Ser. No. 507,617, Sep. 19, 1974, abandoned.

[30] Foreign Application Priority Data

Sep. 21, 1973 [DE] Fed. Rep. of Germany ....... 2347532

[51] Int. Cl.² ............................................. C09B 29/36
[52] U.S. Cl. ................................ 260/157; 260/208; 106/288 Q
[58] Field of Search ......................................... 260/157

[56] References Cited

U.S. PATENT DOCUMENTS 3,109,842  11/1963  Schilling et al. ..................... 260/157

FOREIGN PATENT DOCUMENTS 1808017  6/1970  Fed. Rep. of Germany ........... 260/157

*Primary Examiner*—Charles F. Warren
*Attorney, Agent, or Firm*—Curtis, Morris & Safford

[57] ABSTRACT

A pigment of the formula

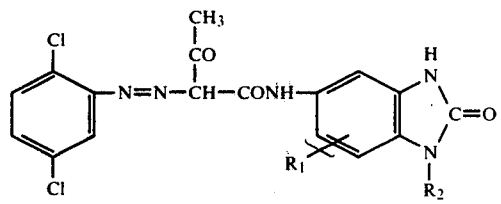

wherein $R_1$ is hydrogen, chlorine or methyl and $R_2$ is hydrogen or methyl. These pigments have a high color strength, fastness to overvarnishing, fastness to migration and fastness to light and weathering. They can be used in all fields in which pigments are used as coloring material, especially for the coloring of lacquers with metal-effect.

4 Claims, No Drawings

DICHLORO-PHENYL-AZO-ACETOACETYLAMINO-BENZIMIDAZOLONE PIGMENTS

This is a continuation of application Ser. No. 703,243 filed July 7, 1976, now abandoned, which application was a continuation of copending application Ser. No. 507,617 filed Sept. 19, 1974, now abandoned.

The present invention relates to new and useful mono azo pigments with high fastnesses; they correspond to the formula I

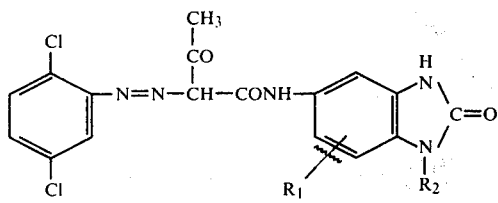

wherein $R_1$ stands for a hydrogen atom or a chlorine atom or a methyl group, $R_2$ for a hydrogen atom or a methyl group, and a process for their preparation by diazotizing 2,5-dichloroaniline in known manner, coupling it with an adequately substituted 5-acetoacetyl-amino-benzimidazolone and that the still moist pigment, either in form of the obtained aqueous suspension or in form of a moisty press cake is either heated in water between 80° and 150° C. or in a water-soluble or water-insoluble organic solvent at a temperature between 80° and 180° C., or that the dried, non-treated pigment is heated with a water-soluble or water-insoluble organic solvent at a temperature between 80° and 180° C. The preparation of the pigments can be effected by combining the solution of the diazo compound with a weakly acid medium in form of a fine dispersion of an obtained azo component, or alternatively, by adding the alkaline solution of the azo component to a solution of the diazo component, adjusted at a $p_H$ value 5 to 6, for example by means of sodium acetate. It is also possible to carry out the coupling reaction by simultaneously adding the solutions of the diazo and azo components preferably to a buffer solution of sodium acetate and acetic acid.

Preference is given to such pigments of the general formula I wherein the substituent $R_1$ is in 7-position.

According to all these methods, it may be advantageous to operate in the presence of cationic, anionic or non-ionic surface-active compounds.

In order to obtain an optimum pigment form as regards grain softness, tinctorial strength, covering power and processability in lacquers and plastic materials, the pigment has to undergo a thermic aftertreatment.

For this purpose, the aqueous pigment suspension or the moisty press cake may be treated in water at a temperature of 80 to 150° C., i.e. where required under pressure, or in the presence or organic solvents at a temperature of 80° to 180° C., eventually also under pressure. The organic solvent thereby used may be water-soluble or water-insoluble. There may be used, for example, alkanoles, preferably of from 1 to 6 carbon atoms, lower carboxylic acids, such as formic acid, acetic acid or propionic acid, carboxylic acid alkyl esters, such as acetic acid- or propionic acid (lower alkyl)-ester or methyl- or ethyl benzoate, aromatic hydrocarbons, such as benzene, toluene, xylene or cumene, chlorinated aromatic hydrocarbons, such as chlorobenzene, o-dichlorobenzene or bromobenzene, or aprotic solvents, such as dimethylformamide, n-methyl-pyrrolidone, tetramethylsulfone or tetramethyl urea.

But the aftertreatment may also be effected in such a way that the above-cited organic solvents act at temperatures varying between 80° and 180° C. on the dried, untreated pigment in a pure form or in mixture with one another.

The thermic aftertreatment of the pigments in an organic solvent is preferred to the pure aqueous aftertreatment.

The azo pigments of the invention are obtained as a yellow powder entirely insoluble in conventional solvents. They excell by a high tinctorial strength, incontestable fastnesses to overvarnishing and to migration and especially by outstanding good fastness to light and weathering. Especially high requirements are imposed to these pigments in respect of the above mentioned fastnesses which are utilized in lacquers with metal-effect. These are synthetic enamels, for example, acryl-melamine resin lacquers, to which aluminum powder of different particle size can be admixtured in the ratio per weight pigment: aluminium powder from 9:1 up to 1:1.

The pigments of the invention are especially superior to comparable azo pigments in the field of metalized lacquers as far as their fastness to light and to weathering is concerned.

The new azo pigments may be used for a variety of application fields, for example for the production of printing pastes, for the preparation of color lakes and dispersion paints or for the coloration of natural rubber, plastic materials, natural or synthetic resins. Furthermore, the pigments are suitable for the pigment printing on a substrate, especially on a textile fibre, as well as on other flat structures, such as paper. They may also be used for other purposes, for example for the dyeing of viscose rayon or cellulose ethers or esters, polyolefins, polyamides, polyurethanes, polyglycol terephthalates or polyacrylonitrile in the stirring solution or for the coloring of paper.

Similar azo pigments are described in the German Patent Application No. 1 227 585 which have a very good fastness to light. It was therefore not expected that the pigments of the invention are considerably superior to the pigments of the above mentioned patent application as far as light- and weathering fastness are concerned.

The following examples illustrate the invention:

EXAMPLE 1:

32,4 g of 2,5-dichloraniline were stirred during the night in 160 ml of 5 N hydrochloric acid. The solution was then adjusted to 0° C. and to a volume of 850 ml by means of ice and water. In one portion, 40 ml of sodium nitrite were added beneath the surface of the solution and stirred during one hour with the nitrite in excess.

In an other container 48 g of 5-acetoacetylaminoben-zimidazolone were dissolved in 400 ml of water and 35,6 ml of a 33% caustic soda solution. This solution, after having been clarified by means of activated charcoal and to which 4 g of an emulsifier consisting of oxethylated oleyl alcohol were added, was put in the course of 1 hour into the afore-mentioned diazonium salt solution of which the nitrite excess was separated by addition of some amido sulfonic acid. During the coupling the $p_H$ value was adjusted to 5 by adding 500 ml of 4 N sodium acetate solution. Stirring was continued for 15 to 30 minutes until the coupling was completed, heated to 95° C., suction filtered and the pigment press cake was washed with water to remove any salt.

250 g of the so obtained moist press cake (at about 17%) were stirred in 1200 ml of water, heated in a closed container up to 150° C. and kept at this temperature during 5 hours. After cooling, the powder was suction filtered, washed with water and dried at 60° C. A reddish yellow pigment powder was obtained which presented excellent fastnesses to overvarnishing and migration, but especially to light and to weathering.

EXAMPLE 2:

About 90 g of the aqueous pigment press cake obtained before the aftertreatment according to example 1 were dried. 15 g of the dried pigment were stirred in 200 ml of glacial acetic acid, brought to reflux and kept during 30 minutes at reflux temperature. After cooling the powder was suction filtered, washed with ethanol and water and the press cake was dried at 60° C. A reddish yellow pigment powder with excellent fastness properties was obtained. When effecting the thermic aftertreatment in the same volume of formic acid or propionic acid instead of using glacial acetic acid, the same result was achieved.

EXAMPLE 3:

62 g of the dried but not aftertreated pigment according to examples 1 or 2 were stirred in 92 ml of water and 145 g of iso-butanol, heated to 150° C. and kept at this temperature during 5 hours. The mixture was cooled to 85° C. and the iso-butanol was separated by distillation by introduction of steam into the container in which the reaction took place. The pigment was suction filtered from the aqueous suspension, washed with some water and dried at 60° to 70° C. A reddish yellow powder with fastness properties as outlined in example 1 was obtained.

If the product is treated in the same volume of methanol, ethanol, isopropanol, N-butanol, pentanol, acetic acid ethyl ester, methyl or ethyl benzoate under the same conditions instead of using iso-butanol, a yellow powder with the same fastness properties is obtained.

EXAMPLE 4:

527 g of an aqueous press cake obtained according example 1 having 25% content of dried pigment were stirred in the autoclave in 1730 g of water and 2125 g of chlorobenzene. After the closure of the reaction vessel it was heated to 125° C. and kept at this temperature during 5 hours. After cooling to 90° to 100° C. the chlorobenzene was subjected to steam distillation. The aqueous pigment suspension was suction filtered, washed with some water and dried at 60° C. A pigment powder with the same properties as mentioned in example 1 was obtained.

If the thermic aftertreatment is effected in the same volume of o-dichlorobenzene or bromobenzene instead of using chlorobenzene, the same result is achieved.

The same result may also be obtained with an aftertreatment of 5 hours at 150° C., under the same conditions, with the same volume of cumene or xylene instead of chlorobenzene.

EXAMPLE 5:

16,2 g of 2,5-dichloroaniline were stirred with 40 ml of a 31% hydrochloric acid and 40 ml of water. Afterwards the solution was cooled with ice to 0° C. and 20 ml of N-sodium nitrite solution were added.

Stirring was continued during 1 hour with an excess of nitrite, the nitrite excess was separated with amido sulfonic acid and the diazo solution was clarified.

28 g of 5-acetoacetylamino-7-chlorobenzimidazolone were mixed with 250 ml of water and dissolved with 18 ml of a 33% sodiumhydroxide solution. This solution and the diazo solution were poured at the same time under quick stirring into a solution consisting of 50 ml of 5 N-sodium acetate solution, 300 ml of water and 20 ml of a 10% solution of the oxethylated product of oleyl alcohol with 30 mol of ethylene oxide at 5° C.

After the completion of the coupling reaction the solution is steam-heated up to 95° C., kept at this temperature during 30 minutes and the pigment was afterwards suction filtered. The press cake was washed salt-free and dried at 60° to 70° C.

By a treatment of the dried crude pigment (22 g) with dimethylformamide (250 ml) during 15 minutes at 125° C. and after a washing of the isolated press cake with dimethylformamide a clear yellow pigment powder was obtained having a good tinctorial strength, covering power and good fastnesses to migration, especially excellent fastnesses to light and weathering.

EXAMPLE 6:

200 g of the 25% aqueous press cake obtained according to example 5 were stirred before the aftertreatment wi with 500 g of about 68% iso-butanol and heated in a closed vessel during 5 hours at 150° C. After cooling down to about 80° C. the iso-butanol was subjected to steam distillation, the remaining aqueous pigment suspension was suction filtered and again washed with some hot water. After drying a yellow pigment powder was obtained possessing the same properties as indicated in example 5.

The following table contains further pigments as well as their shades of the general formula I, which can be obtained in an analogous way.

| Diazocomponent | coupling component | shade |
|---|---|---|
| 2,5-dichloroaniline | 5-acetoacetylamino-6-chloprobenzimide-azolone | yellow |
| " | 5-acetoacetylamino-7-methylbenzimid-azolone | " |
| " | 5-acetoacetylamino-N-methylbenzimid-azolone | " |

What we claim is:
1. A mono azo pigment of the formula

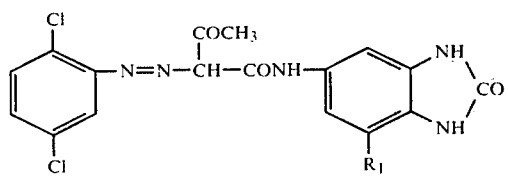

wherein $R_1$ is hydrogen, chlorine or methyl.
2. The mono azo pigment of claim 1 which is 4. The mono azo pigment of claim 1 which is
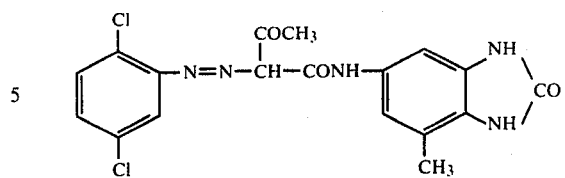
3. The mono azo pigment of claim 1 which is
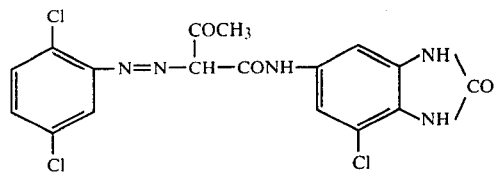
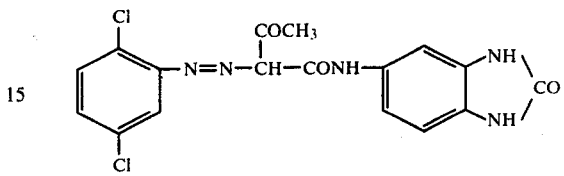
* * * * *